(12) United States Patent
Li et al.

(10) Patent No.: US 10,239,774 B2
(45) Date of Patent: Mar. 26, 2019

(54) NATURAL PYRRHOTITE BIOLOGICAL FILTER AND METHOD FOR UTILIZING SAME TO SYNCHRONOUSLY REMOVE NITRATE-NITROGEN AND PHOSPHORUS FROM WATER

(71) Applicant: NANJING UNIVERSITY, Nanjing (CN)

(72) Inventors: Ruihua Li, Nanjing (CN); Junsong Hu, Nanjing (CN); Qianqian Sun, Nanjing (CN); Xiaomei Zhang, Nanjing (CN); Zhuo Liu, Nanjing (CN); Xinmin Zhan, Nanjing (CN); Aimin Li, Nanjing (CN)

(73) Assignee: NANJING UNIVERSITY (CN)

( * ) Notice: Subject to any disclaimer, the term of this patent is extended or adjusted under 35 U.S.C. 154(b) by 98 days.

(21) Appl. No.: 14/907,623

(22) PCT Filed: Jun. 28, 2014

(86) PCT No.: PCT/CN2014/076323
§ 371 (c)(1),
(2) Date: Jan. 26, 2016

(87) PCT Pub. No.: WO2015/089971
PCT Pub. Date: Jun. 25, 2015

(65) Prior Publication Data
US 2016/0311712 A1  Oct. 27, 2016

(30) Foreign Application Priority Data
Dec. 17, 2013 (CN) .......................... 2013 1 0695460

(51) Int. Cl.
| | | |
|---|---|---|
| *C02F 1/28* | (2006.01) | |
| *C02F 1/52* | (2006.01) | |
| *C02F 3/00* | (2006.01) | |
| *C02F 3/28* | (2006.01) | |
| *C02F 3/34* | (2006.01) | |
| *C02F 101/10* | (2006.01) | |
| *C02F 101/16* | (2006.01) | |

(52) U.S. Cl.
CPC ............ *C02F 3/2826* (2013.01); *C02F 1/281* (2013.01); *C02F 1/5245* (2013.01); *C02F 3/006* (2013.01);
(Continued)

(58) Field of Classification Search
CPC ...... C02F 3/2826; C02F 1/281; C02F 1/5245; C02F 3/006; C02F 3/345
(Continued)

(56) References Cited

FOREIGN PATENT DOCUMENTS

| CN | 101723506 A | * 6/2010 |
|---|---|---|
| CN | 101973629 A | 2/2011 |

(Continued)

OTHER PUBLICATIONS

CN101723506 English Machine Translation, pp. 1-7 (Year: 2010).*
(Continued)

*Primary Examiner* — Claire A Norris
(74) *Attorney, Agent, or Firm* — Schmeiser, Olsen & Watts, LLP

(57) ABSTRACT

The field of advanced wastewater treatment, and more specifically, to a natural pyrrhotite biofilter and a method for utilizing same to synchronously remove nitrate-nitrogen and phosphorus from water is provided. The method includes the following steps: (1) preparation of the packing material and construction of the biofilter; (2) start-up of the biofilter; (3) operation of the biofilter. The method disclosed in the present invention on the one hand takes pyrrhotite as the electron donor to help sulfur-based autotrophic denitrifying bacteria reduce nitrates into nitrogen gas, and on the other hand utilizes pyrrhotite and its oxidates to eliminate phosphorus through adsorption and chemical precipitation. Therefore, this method realizes synchronous removal of nitrate-nitrogen and phosphorus in water.

5 Claims, 3 Drawing Sheets

(52) U.S. Cl.
CPC ........ *C02F 3/345* (2013.01); *C02F 2003/001* (2013.01); *C02F 2101/105* (2013.01); *C02F 2101/163* (2013.01); *C02F 2209/001* (2013.01); *C02F 2209/06* (2013.01); *C02F 2209/44* (2013.01); *C02F 2305/06* (2013.01)

(58) Field of Classification Search
USPC .......................................................... 210/617
See application file for complete search history.

(56) References Cited

FOREIGN PATENT DOCUMENTS

| CN | 102603064 A | 7/2012 |
| CN | 102923961 A | 2/2013 |
| CN | 103626293 A | 3/2014 |
| JP | 0474598 A | 3/1992 |

OTHER PUBLICATIONS

CN101973629 English Machine Translation, pp. 1-8 (Year: 2012).*
International Search Report for PCT/CN2014/076323, dated Sep. 26, 2014.
A Chinese patent entitled "A Method for Synchronous Removal of Nitrogen and Phosphorous from the Nitrogen- and Phosphorus-containing Wastewater" No. 201210095370.9).
Chinese patent "A Method for Removing Nitrogen and Phosphorus Using Pyrite as Biochemical Packing Material" (ZL201010524339.3).

* cited by examiner

NATURAL PYRRHOTITE BIOLOGICAL FILTER AND METHOD FOR UTILIZING SAME TO SYNCHRONOUSLY REMOVE NITRATE-NITROGEN AND PHOSPHORUS FROM WATER

CROSS-REFERENCE TO RELATED APPLICATIONS

This application claims priority to PCT Application No. PCT/CN2014/076323, having a filing date of Jun. 28, 2014, based off of Chinese Application No. 201310695460.6 having a filing date of Dec. 17, 2013, the entire contents of which are hereby incorporated by reference.

FIELD OF TECHNOLOGY

The following relates to the field of advanced wastewater treatment, and more specifically, to a natural pyrrhotite biofilter and a method for utilizing same to synchronously remove nitrate-nitrogen and phosphorus from water.

BACKGROUND

The traditional biological denitrification method in the field of water treatment is adopting nitrifying bacteria to convert ammonium nitrogen into nitrate-nitrogen under oxic conditions and then adopting heterotrophic denitrifying bacteria to convert nitrate-nitrogen into nitrogen gas, so as to realize removal of nitrogen in water. Meanwhile, the traditional biological dephosphorization method in the field of water treatment is adopting dephosphorizing bacteria firstly to release phosphorus under anaerobic conditions and then to absorb excessive phosphorus under oxic conditions, along with mass propagation of the bacteria; the phosphorus in water is then easily removed by filtering away organisms of dephosphorizing bacteria that have absorbed excessive phosphorus. Both methods of biological denitrification and biological dephosphorization involve oxic and anoxic (anaerobic) phases, therefore when applied in series or any form of combined way (namely, $A^2/O$ synchronous nitrogen and phosphorous removal process), the whole water treatment process will be very long and complicated. As is shown above, the removal of nitrogen and phosphorus depends on life activities of denitrifying bacteria and dephosphorizing bacteria respectively, however, in the course of dephosphorization, even though dissolved oxygen and carbon sources are required by both types of bacteria, their sludge age and their specific requirements for anaerobic conditions are different. Therefore, when these two types of bacteria are integrated in one process to realize synchronous removal of nitrogen and phosphorus, there may inevitably exist such problems as how to obtain balanced status between two types of bacteria in terms of sludge age and required anaerobic conditions, and how to deal with the competition for dissolved oxygen and organic substances between two types of bacteria. These problems bring great challenges to the water treatment process and make it hardly possible to achieve desirable effect in removing nitrogen and phosphorus. Besides, the process depends upon biodegradable organic substances, and when biodegradable organic substances in the water is insufficient (namely, low C/N ratio), it is necessary to add methanol and other organic substances into water to achieve good effect in nitrogen and phosphorus removal, which may further increase water treatment cost and bring about the risk of over-standard discharge of effluent COD.

In respect to the problem of nitrogen removal of wastewater with low C/N ratio, sulfur-based autotrophic denitrification processes, for example, sulfur/limestone autotrophic denitrification process (SLAD), have been developed to realize denitrifying nitrogen removal despite the absence of carbon sources. However, these processes lead to overly high concentrations of both calcium ions and sulfates in the final effluent, and poor effect in phosphorus removal as well.

In respect to the above problems existent in SLAD, a Chinese patent entitled "A Method for Removing Nitrogen and Phosphorus Using Pyrite as Biochemical Packing Material" (ZL201010524339.3) discloses a method for synchronous removal of nitrogen and phosphorus using pyrite and limestone in combination. This method, by adopting pyrite's anaerobic bio-oxidation process, integrates sulfur-based autotrophic denitrification process and chemical phosphorus removal process together. However, it results in such problems as introduction of limestone to neutralize the water for desirable pH value, high concentration of calcium ions in the water, and low efficiency in nitrogen removal. When this method is adopted to treat wastewater, it takes 5 days to fully remove 30 mg/L nitrate-nitrogen from the wastewater, and the efficiency is even worse when temperature is under 20° C.

When being adopted for synchronous removal of nitrogen and phosphorus, both SLAD and the pyrite method mentioned above introduce limestone as auxiliary material to neutralize the $H^+$ generated in the process so that the removal process of nitrogen and phosphorus can be guaranteed. Except the function of neutralization, limestone plays no role in the whole process of synchronous removal of nitrogen and phosphorus. As limestone occupies a considerably large volume within the reactor, its introduction to the reaction system reduces the rector's volume-specific efficiency in synchronous removal of nitrogen and phosphorus.

A Chinese patent entitled "A Method for Synchronous Removal of Nitrogen and Phosphorous from the Nitrogen- and Phosphorus-containing Wastewater" (application number: 201210095370.9) discloses a method for synchronous removal of nitrogen and phosphorus in wastewater by using ferrous sulfide. This method introduces ferrous sulfide into a batch reactor to realize synchronous removal of nitrogen and phosphorus in wastewater under strict control of anaerobic conditions. When being adopted to treat a wastewater sample containing 53 mg/L nitrate-nitrogen and 1.14 mg/L phosphorus, this method, after 2 days of operation, can remove 73.6% of nitrate-nitrogen and 97.4% of phosphorous. Despite the good performance it exhibits in synchronous removal of nitrogen and phosphorous, this method is troubled with problems such as being unfit for continuous operation, requirement of carbon dioxide stripping for maintaining strict anaerobic conditions, and demand for an extra solid-liquid separation process after treatment, all of which lead to poor applicability of this method.

SUMMARY

1. Problems to be Solved

There are many problems existent in the prior art: the traditional bio-treatment processes, for example, $A^2/O$, present poor effect in nitrogen and phosphorus removal when the C/N ratio of the wastewater is low; the sulfur-limestone system presents good effect in nitrogen removal but practically eliminates no phosphorus; the pyrite-limestone system presents good effect in nitrogen and phosphorus removal, but its removal rate of nitrogen is too low and the addition of limestone as auxiliary material into the reaction system causes extra problems; the sulfur-based nitrogen and phosphorus removal system presents not only good effect in nitrogen and phosphorus removal, but also high nitrogen removal rate due to the introduction of an industrial product, ferrous sulfide, to the reaction system, but the operation of the system requires strict anaerobic environment and can only be conducted intermittently, which consequently leads to poor applicability of the whole system due to the existence of such defects as poor treatment capability, complex culturing medium for microorganisms and high overall treatment cost. In view of all problems existent, embodiments of the present invention provides a natural pyrrhotite biofilter and a method for utilizing same to synchronously remove nitrate-nitrogen and phosphorus from water, wherein only one substance, namely, pyrrhotite, is added into the reaction system. During the operation, *Thiobacillus denitrificans*, by taking the pyrrhotite as sulfur source, can reduce nitrates into nitrogen gas under the condition of continuous water inflow; meanwhile, the iron ions generated in the metabolistic process of *Thiobacillus denitrificans* and the pyrrhotite itself can remove phosphorus in water through adsorption and chemical precipitation. Therefore, this method is able to reach high efficiency in synchronous removal of nitrogen and phosphorus. In addition, since the H⁺ generated during the process disclosed in embodiments of the present invention is of small quantity, no limestone is required for water neutralization, which substantially improves the reactor's volume-specific efficiency in water treatment.

2. Technical Solutions

The following technical solutions are adopted in embodiments of the present invention to address various problems exhibited in the prior art:

A natural pyrrhotite biofilter and a method for utilizing same to synchronously remove nitrate-nitrogen and phosphorus from water, comprising the following steps:

(1) Preparation of the packing material and construction of the biofilter: prepare pyrrhotite in the granular form with the grain size between 2-20 mm; pack the granular pyrrhotite in the reactor, then wash the rector with clean water till the pH of the washing water reaches 6-7. In practical use, the washing process can be stopped when the water out of the water outlet turns to colorless; the reactor is designed with a water inlet on the bottom and a water outlet on the top; the best treatment effect can be obtained when the reactor is a cylindrical reaction column.

(2) Start-up of the biofilter: mix anaerobic sludge and nutrient solution into a mixed nutrient solution, use a pump to pump the mixed nutrient solution into the bottom of the reactor via the water inlet; the mixed nutrient solution then flows out of the reactor via the water outlet, and is pumped back into the reactor again; continue the cyclical process till the removal rate of nitrate-nitrogen reaches its stability;

(3) Operation of the biofilter: pump the wastewater to be treated via the water inlet into the reactor that has been started up through Step (2), adjust the hydraulic retention time at 12-48 hours in relation to the concentration of nitrate-nitrogen in the wastewater; the nitrate-nitrogen and phosphorus in wastewater will be synchronously removed and the up-to-standard discharge of the final effluent can be achieved.

Preferably, the anaerobic sludge used in Step (2) is ordinary anaerobic sludge for wastewater treatment.

Preferably, the hydraulic retention time of the mixed nutrient solution used in the start-up of the biofilter in Step (2) is 12-24 hours.

Preferably, the components and their corresponding concentrations in the nutrient solution in Step (2) are: $Na_2S_2O_3 \cdot 5H_2O$ 5 g/L, $KNO_3$ 2 g/L, $KH_2PO_4$ 0.1 g/L and $NaHCO_3$ 2 g/L. embodiments of the present invention discover unexpectedly that, due to its slight solubility in water, pyrrhotite, when prepared in the form of 2-20 mm granules, can provide many supplementary nutrient elements required by microorganisms. This means that the nutrient solution only needs to provide the main elements demanded for microorganism growth, which consequently greatly simplifies the preparation process for the nutrient solution in comparison with the process of preparing the culturing medium for microorganisms illustrated in both Chinese patent "A Method for Removing Nitrogen and Phosphorus Using Pyrite as Biochemical Packing Material" (ZL201010524339.3) and Chinese patent "A Method for Synchronous Removal of Nitrogen and Phosphorous from the Nitrogen- and Phosphorus-containing Wastewater" (application number: 201210095370.9).

The technical principle of embodiments of the present invention is, on the basis of full utilization of physiological and biochemical characteristics of sulfur-based autotrophic denitrifying bacteria, and careful control of the grain size of pyrrhotite and start-up parameters of a biofilter, to realize on the one hand nitrogen removal as a result of the fact that the growth of sulfur-based autotrophic denitrifying bacteria consumes most of nitrates in water and on the other hand phosphorus removal as a result of the fact that the iron ions generated in the metabolistic process of sulfur-based autotrophic denitrifying bacteria and the pyrrhotite itself can remove phosphorus in water. Therefore, the biological and chemical ways of nitrogen removal are naturally integrated in embodiments of the present invention. The reaction equation of pyrrhotite with nitrate under the action of microorganisms is as below:

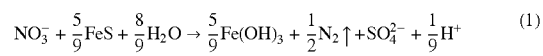

$$NO_3^- + \frac{5}{9}FeS + \frac{8}{9}H_2O \rightarrow \frac{5}{9}Fe(OH)_3 + \frac{1}{2}N_2\uparrow + SO_4^{2-} + \frac{1}{9}H^+ \quad (1)$$

The reaction equation of pyrite with nitrate under the action of microorganisms, as is described in the Chinese patent "A Method for Removing Nitrogen and Phosphorous Using Pyrite as Biochemical Packing Material" (ZL201010524339.3), is as below:

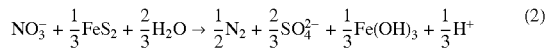

$$NO_3^- + \frac{1}{3}FeS_2 + \frac{2}{3}H_2O \rightarrow \frac{1}{2}N_2 + \frac{2}{3}SO_4^{2-} + \frac{1}{3}Fe(OH)_3 + \frac{1}{3}H^+ \quad (2)$$

It can be seen from these two equations that, to remove nitrates of the same quantity, the H⁺ generated in the pyrrhotite case is only ⅓ of that generated in the pyrite case, which significantly reduces demand of alkalinity. The desirable pH of the system can be maintained without adding any alkaline into the water. Thus limestone is not demanded for the pyrrhotite biofilter disclosed in embodiments of the present invention.

A natural pyrrhotite biofilter and a method for utilizing same to synchronously remove nitrate-nitrogen and phosphorus from water, wherein the biofilter is the reactor that has been treated through step (1) and step (2).

3. Beneficial Effects

Compared with the prior art, embodiments of the present invention has the following beneficial effects:

(1) Embodiments of the present invention prepares pyrrhotite in the granular form with the grain size between 2-20 mm and packs the granular pyrrhotite in the reactor; after the start-up step, the reactor can synchronously remove nitrate-nitrogen and phosphorous in wastewater despite the low C/N ratio, a beneficial effect enabling embodiments of the present invention to be applied for advanced treatment of wastewater and the eutrophic water;

(2) The pyrrhotite adopted in embodiments of the present invention are cheap and easily available; after the start-up step, the reactor, when adopted to treat wastewater with the low C/N ratio, generates almost no $H^+$, which means no neutralizer (limestone) is required in the whole reaction; in addition, two mechanisms, namely, removal of nitrogen by autotrophic denitrification and removal of phosphorus by chemical reaction are utilized in embodiments of the present invention to realize synchronous removal of nitrates and phosphorus;

(3) Embodiments of the present invention show desirable effect and high efficiency in removing nitrogen and phosphorus synchronously; as taking natural pyrrhotite as the only major reactant, embodiments of the present invention are also technically simple and practical, and high in treatment capability.

BRIEF DESCRIPTION

Some of the embodiments will be described in detail, with reference to the following figures, wherein like designations denote like members, wherein.

Figure 4:
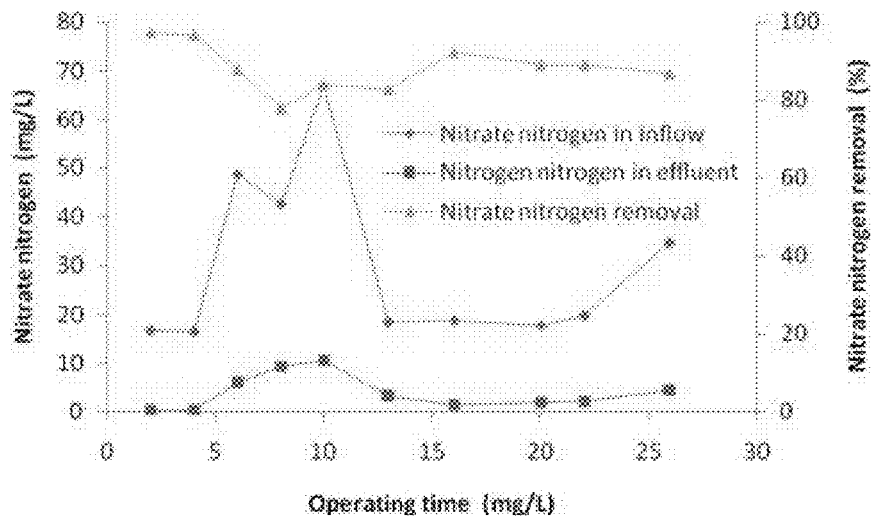
Figure 5:
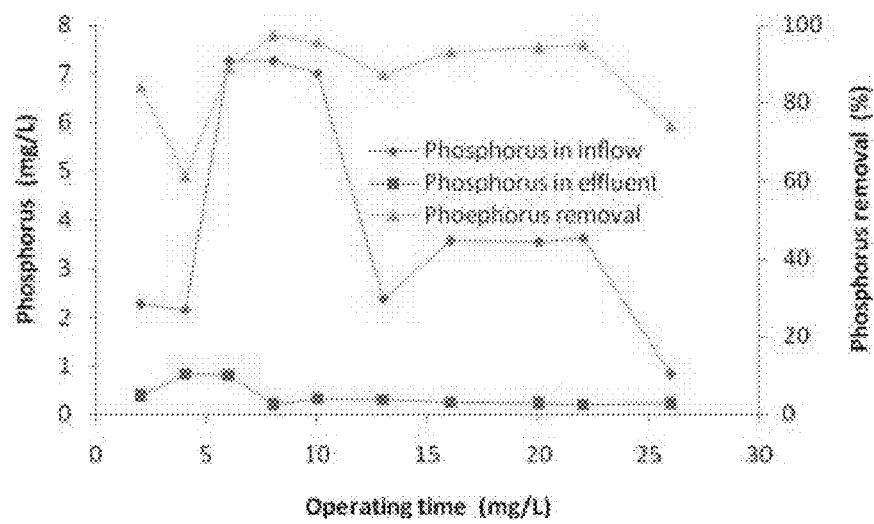

FIG. 4 illustrates the effect of the method disclosed in an embodiment of the present invention in removing nitrogen in the secondary effluent from a wastewater treatment plant, shown in Embodiment 4; and FIG. 5 illustrates the effect of the method disclosed in an embodiment of the present invention in removing phosphorous in the secondary effluent from a wastewater treatment plant, shown in Embodiment 4.

DETAILED DESCRIPTION

Embodiments of the present invention will be further detailed hereinafter in conjunction with the embodiments.

Embodiment 1

Figure 1:
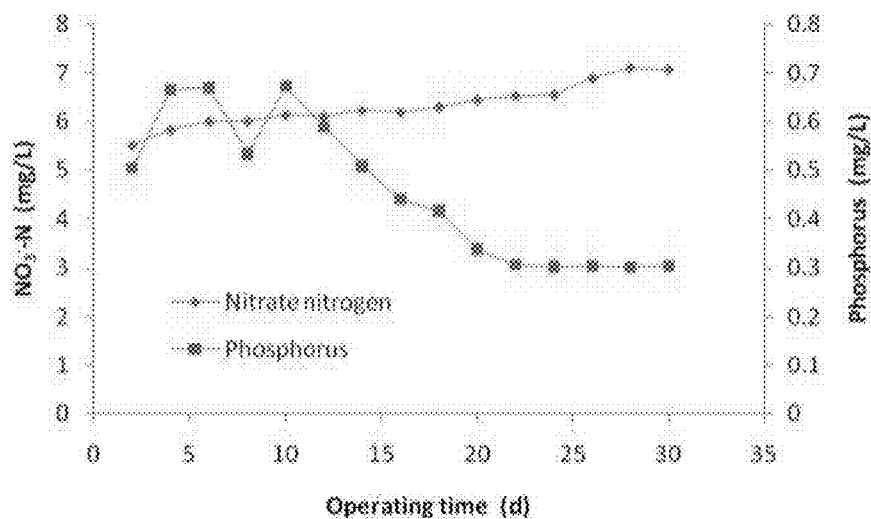
FIG. 1 illustrates the effect of the method disclosed in an embodiment of the present invention in synchronously removing nitrogen and phosphorous in the simulated wastewater, shown in Embodiment 1.

The water under test is simulated wastewater prepared with tap water, potassium dihydrogen phosphate and potassium nitrate, wherein the concentrations of major pollutants are: $NO_3^-$—N 27 mg/L and $PO_4^{3-}$—P 6 mg/L, with the water temperature at 18° C.; the treatment steps are as follows:

(1) Preparation of the packing material and construction of the biofilter: prepare pyrrhotite in the granular form with the grain size between 2-20 mm; pack the granular pyrrhotite in the rector, and then wash the rector with clean water; stop the washing process when the effluent from the water outlet turns nearly colorless; measurement indicates that the pH of the washing water is 6; the reactor is designed in the form of a cylindrical column with the height-diameter ratio of 3:1; a water inlet is designed on the bottom and a water outlet on the top; a cone is connected to both ends of the column in order to realize even distribution of water inflow and outflow;

(2) Start-up of the biofilter: mix the anaerobic sludge and nutrient solution into a mixed nutrient solution, and then use a pump to pump the mixed nutrient solution into the bottom of the reactor via the water inlet; after 12 hours of hydraulic retention time, channel the mixed nutrient solution out via the water outlet and pumps it back into the reactor again; continue the cyclical process till the removal rate of nitrate-nitrogen reaches its stability; the components and their corresponding concentrations in the nutrient solution are: $Na_2S_2O_3 \cdot 5H_2O$ 5 g/L, $KNO_3$ 2 g/L, $KH_2PO_4$ 0.1 g/L and $NaHCO_3$ 2 g/L;

(3) Operation of the biofilter: pump the simulated wastewater via the water inlet into the reactor that has been started up through Step (2), adjust the hydraulic retention time to 12 hours and operate the biofilter for a month; take samples for analysis every two days, with the results shown in FIG. 1; synchronous removal of nitrate-nitrogen and phosphorous in wastewater is achieved, and the effluent meets the discharge standards. The concentrations of nitrate-nitrogen and phosphate phosphorus in the final effluent maintain at 7 mg/L and 0.3 mg/L, respectively, while the removal rates of nitrate-nitrogen and phosphorus reach 74% and 95%, respectively.

Embodiment 2

Figure 2:
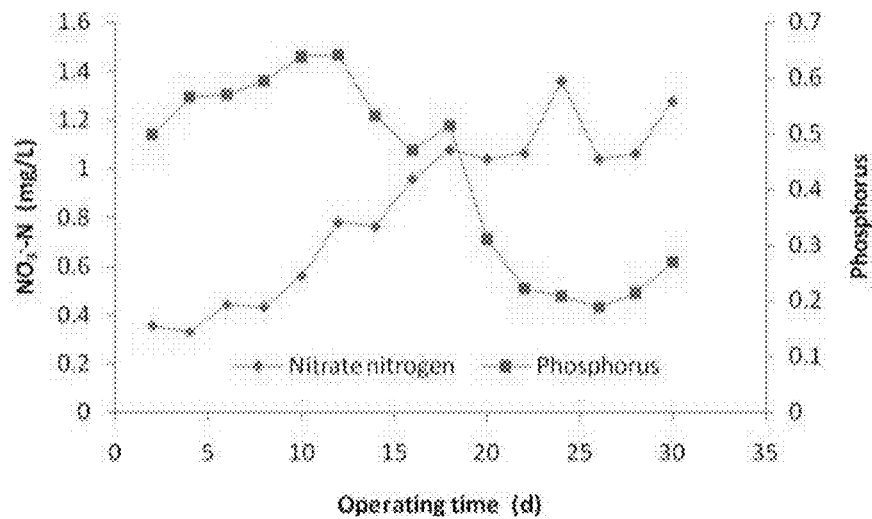
FIG. 2 illustrates the effect of the method disclosed in an embodiment present invention in synchronously removing nitrogen and phosphorous in the simulated wastewater, shown in Embodiment 2.

Same as Embodiment 1, with exceptions as follows: in Step (2), the hydraulic retention time of the mixed nutrient solution during the start-up of the biofilter is adjusted to 24 hours; pump the simulated wastewater into the reactor that has been started up through Step (2), adjust the hydraulic retention time to 24 hours, and operate the biofilter for a month; take samples for analysis every two days, with the results shown in FIG. 2. The concentrations of nitrate-nitrogen and phosphate phosphorus in the final effluent maintains at 1.13 mg/L and 0.22 mg/L, respectively, while the removal rate of nitrate-nitrogen and phosphorus reaches 95.8% and phosphorous 96.3%, respectively.

Embodiment 3

Same as Embodiment 1, with exceptions as follows: in Step (2), the hydraulic retention time of the mixed nutrient solution during the start-up of the biofilter is adjusted to 20 hours; the reactor is designed in the cuboid form, with the length-width ratio of 3:1.

Figure 3:
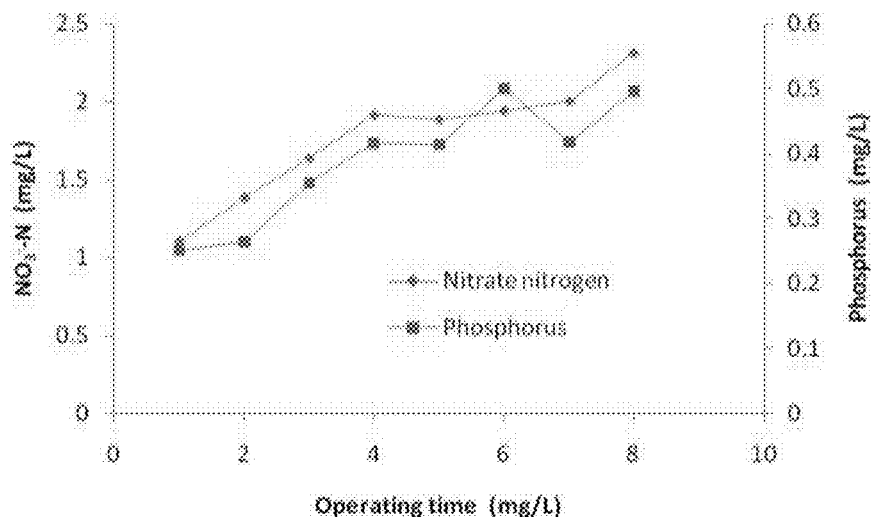
FIG. 3 illustrates the effect of the method disclosed in an embodiment of the present invention in synchronously removing nitrogen and phosphorous in the simulated wastewater, shown in Embodiment 3.

The water under test is simulated wastewater prepared with tap water, potassium dihydrogen phosphate and potassium nitrate, wherein the concentrations of major pollutants are: $NO_3^-$—N 28 mg/L and $PO_4^{3-}$—P 12 mg/L, with the water temperature at 18° C.; pump the simulated wastewater into the reactor that has been started up in Step (2), adjust the hydraulic retention time to 24 hours, and operate the biofilter for a month; take samples for analysis every two days, with the results shown in FIG. 3. The concentrations of nitrate-nitrogen and phosphate phosphorus maintain at 2.03 mg/L and 0.47 mg/L, respectively, while the removal rates of nitrate-nitrogen and phosphorus reach 92.8% and 96.1%, respectively.

Embodiment 4

Same as Embodiment 1, with exceptions as follows: the pyrrhotite biofilter disclosed in embodiments of the present invention is adopted to treat the secondary effluent from a wastewater treatment plant. The average concentrations of nitrate-nitrogen and phosphorous in said secondary effluent are 29.99±17.58 mg/L and 3.99±2.36 mg/L, respectively. Take samples for analysis every two days, with the results shown in FIG. 4 and FIG. 5. The concentrations of nitrate-nitrogen and phosphorous in the final effluent are 4.02±3.61 mg/L and 0.37±0.25 mg/L, respectively, while the average removal rates of nitrate-nitrogen and phosphorus are 88.39±6.08% and 86.99±11.4%, respectively. The reactor is designed in the cuboid form, with the length-width ratio of 3:1.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed is:

1. A method for synchronous removal of nitrate-nitrogen and phosphorous in wastewater using a natural pyrrhotite biofilter, comprising the following steps:
    (1) preparing packing material and construction of the natural pyrrhotite biofilter comprising a reactor: preparing pyrrhotite in the granular form with the grain size between 2-20 mm; packing the granular pyrrhotite in the reactor and then washing the reactor with clean water before start-up of the natural pyrrhotite biofilter and until the pH of water exiting the reactor reaches 6-7 at which point the washing is stopped; the reactor is designed with a water inlet on the bottom and a water outlet on the top;
    (2) starting-up of the natural pyrrhotite biofilter: mixing an anaerobic sludge and nutrient solution into a mixed nutrient solution, using a pump to pump the mixed nutrient solution into the bottom of the reactor via the water inlet; the mixed nutrient solution then flows out of the reactor via the water outlet, and is pumped back into the reactor again as part of a cyclical process; continuing the cyclical process till the removal rate of nitrate-nitrogen reaches a stability point; and
    (3) operating of the natural pyrrhotite biofilter: pumping the wastewater to be treated via the water inlet into the reactor that has been started up through Step (2), adjusting the hydraulic retention time to 12-48 hours; the nitrate-nitrogen and phosphorous in the wastewater will be synchronously removed and the up-to-standard discharge of final effluent can be achieved;
    wherein the method is conducted without the use of limestone.

2. The method for synchronous removal of nitrate-nitrogen and phosphorous in water using a natural pyrrhotite biofilter as defined in claim 1, wherein the anaerobic sludge used in Step (2) is ordinary anaerobic sludge for wastewater treatment.

3. The method for synchronous removal of nitrate-nitrogen and phosphorous in water using a natural pyrrhotite biofilter as defined in claim 1, wherein the hydraulic retention time of the mixed nutrient solution during the start-up of the natural pyrrhotite biofilter in Step (2) is 12-24 hours.

4. The method for synchronous removal of nitrate-nitrogen and phosphorous in water using a natural pyrrhotite biofilter as defined in claim 1, wherein the components and their corresponding concentrations in the nutrient solution in Step (2) are: $Na_2S_2O_3.5H_2O$ 5 g/L, $KNO_3$ 2 g/L, $KH_2PO_4$ 0.1 g/L and $NaHCO_3$ 2 g/L.

5. A biofilter for synchronous removal of nitrate-nitrogen and phosphorous in water using natural pyrrhotite, wherein said biofilter is the reactor that has been treated through step (1) and step (2) defined in claim 1.

* * * * *